Oct. 4, 1955        O. P. ERHARDT        2,719,713
                TAPE-DISPENSING DEVICES
Filed Oct. 9, 1948                    6 Sheets-Sheet 1

Fig.1.

Inventor
Oscar P. Erhardt
By Rockwell + Bartholow
Attorneys

Oct. 4, 1955     O. P. ERHARDT     2,719,713

TAPE-DISPENSING DEVICES

Filed Oct. 9, 1948     6 Sheets-Sheet 2

Fig. 2.

Inventor
Oscar P. Erhardt
By Rockwell & Nicholas
Attorneys

Oct. 4, 1955   O. P. ERHARDT   2,719,713
TAPE-DISPENSING DEVICES
Filed Oct. 9, 1948   6 Sheets-Sheet 4

Inventor
Oscar P. Erhardt
By Rockwell P. Bartholow
Attorneys

Oct. 4, 1955

O. P. ERHARDT 2,719,713

TAPE-DISPENSING DEVICES

Filed Oct. 9, 1948

Inventor

Oscar P. Erhardt

By Rockwell H. Bartholow

Attorneys

Oct. 4, 1955 — O. P. ERHARDT — 2,719,713
TAPE-DISPENSING DEVICES
Filed Oct. 9, 1948

Inventor
Oscar P. Erhardt
By Rockwell Bartholow
Attorneys

United States Patent Office 2,719,713
Patented Oct. 4, 1955

2,719,713

TAPE-DISPENSING DEVICES

Oscar P. Erhardt, Derby, Conn., assignor to Derby Sealers, Incorporated, Derby, Conn., a corporation of Connecticut Application October 9, 1948, Serial No. 53,653

10 Claims. (Cl. 271—2.4)

This invention relates to a tape-serving machine and, more particularly, to a device for serving or dispensing gummed-tape used in the sealing of packages and cartons, or the like.

In the sealing of cartons and packages, it is often desired to use strips of different lengths. In many instances where tape-serving devices are used in factories, cartons or packages of the same size are required to be sealed so that the same length, or lengths, of strips are required for one package as for another, although each package may require strips of different length. It is, therefore, desirable to provide a tape dispenser which may be adjusted to dispense strips of different lengths as well as strips of the same length, and to be able to dispense strips of more than two different lengths, and that this be done in the desired sequence without the necessity of the operator having to make any changes in the machine.

In the past, dispensers which were capable of delivering strips of different lengths required manipulation on the part of the operator when a change was made from one length of strip to the other. That is, if the machine is delivering strips of one length, some operation must be performed in order to cause it to deliver a strip of a different length. In the present invention, it is contemplated to provide a machine which may be set to deliver strips of different lengths in the order desired by the operator. That is to say, the machine may be adjusted for a given cycle of operations upon successive feeding movements of the operating lever.

Specifically, for example, the device may be set or adjusted to deliver strips of the same length when desired, or it may be set to deliver one strip of one length and two strips of a different length, and continue to dispense strips in a predetermined sequence upon successive operations of the device without any attention on the part of the operator so far as the length of strip is concerned.

This principle can be carried further and the device adjusted to deliver strips of three different lengths. That is, it may be set to deliver a long strip, a strip of medium length, and a short strip. Moreover, when the device is set for any given cycle of operations, the order in which the strips of different lengths are served can be varied by varying the position of the parts when the first strip is severed. For example, the device may be set to deliver one long and two short strips, the long strip being delivered upon the first operation of the machine. By changing the adjustment at the start of the operation, however, the device can be set to first deliver a short strip, and the order of delivery would then be two short strips and one long strip. Also, it can be adjusted to first deliver the second short strip, and in that case the order of delivery would be a short strip, a long strip and then a short strip. Other combinations of lengths of strips may be delivered by the device, as will be hereinafter explained.

One object of the present invention is to provide a new and improved machine for dispensing strips of tape.

A further object of the invention is to provide a tape-serving machine which will deliver strips of different lengths, the change being made from a strip of one length to that of another length without attention on the part of the operator.

Still another object of the invention is to provide a tape-serving device which may be set to pass through a given cycle of operations and then repeat this cycle, the machine delivering strips of tape of different lengths in each cycle of operations, and this result being effected by operation of the actuating means of the device, without more.

A still further object of the invention is to provide a tape-serving machine having cooperating stop members, one of said stop members being movable and being connected with the tape-feeding mechanism so that it will be moved to various positions by the operation of the feeding mechanism in order to effect the feeding of strips of different lengths from the machine.

Still another object of the invention is to provide a plurality of such movable stops on the machine, all of which are moved by the feeding mechanism, and also to provide cooperating, adjustable stops upon a part of the feeding mechanism, so that strips of a plurality of different lengths may be dispensed by the machine.

To these and other ends the invention consists in the novel features and combinations of parts to be hereinafter described and claimed.

To illustrate a preferred embodiment of my invention, I have shown a tape-dispensing device comprising a base 10 having side plates or frame members 11 and 12, these plates serving to support the working parts of the device, and also housing between them the supply roll 13 of tape which rests upon the base 10 and is restrained from forward and rear movement by rollers 14 and 15. As shown at 16, the end of the tape passes from the roll 13 over a guide roll 17 and then forwardly and downwardly between feed rolls 18 and 19. The roll 19 is positively driven, as will be hereinafter described, while the cooperating roll 18 is mounted upon a shaft 20, the ends of which may move vertically in slots 21 in the plate members. This shaft 20 is urged downwardly so that the feed roll 18 is urged toward the roll 19 by springs 22 secured at their upper ends to the shaft 20 and at their lower ends to the lower portions of the side plates 11 and 12.

Figure 1:
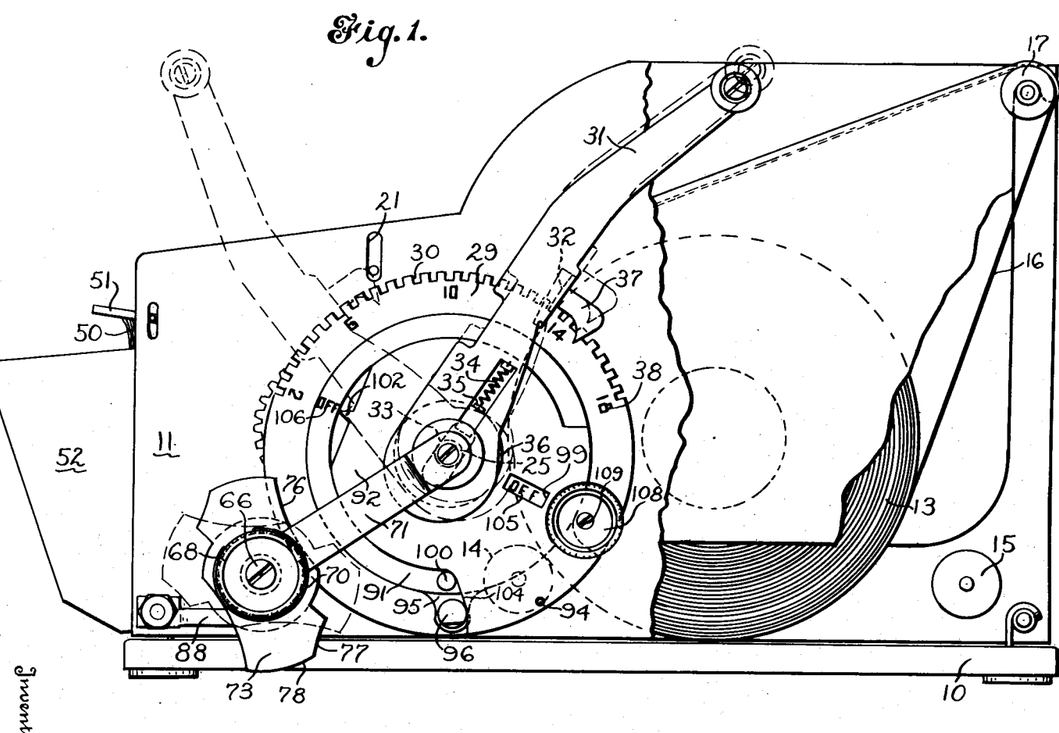
Fig. 1 is a side elevational view of a tape-serving device embodying my invention.
Figure 3:
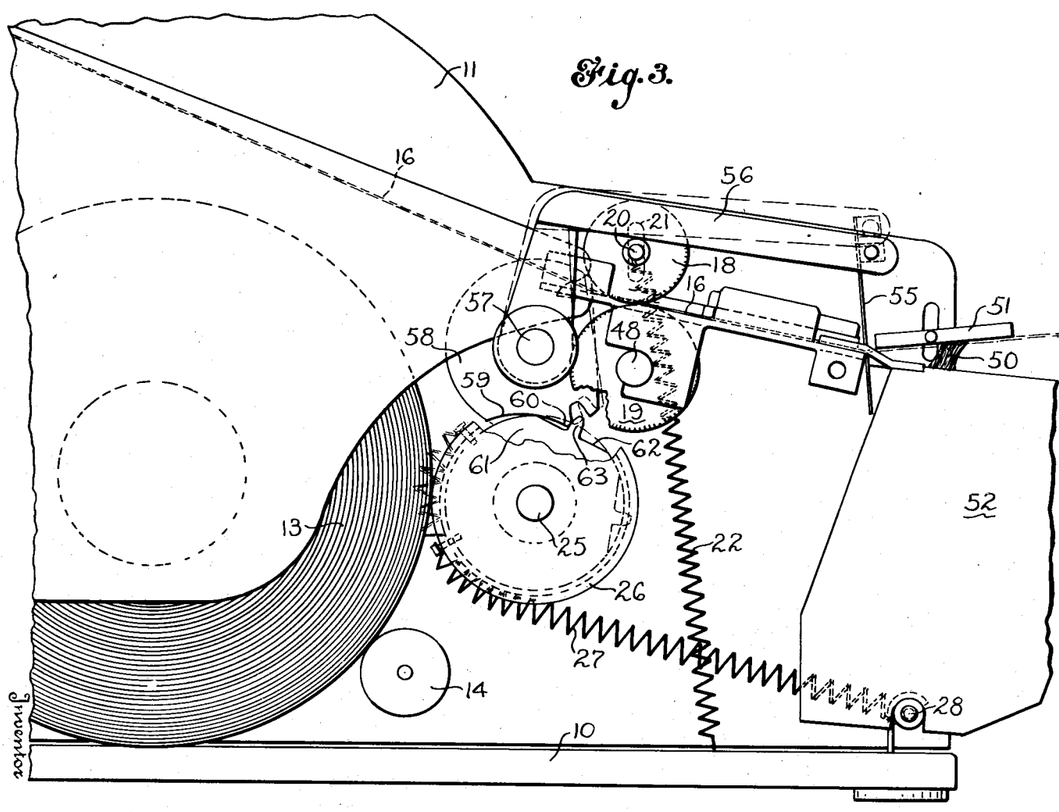
Fig. 3 is a side elevational view taken from the side opposite that shown in Fig. 1, some parts being broken away to show the interior mechanism.

Rotatably mounted in the side plates 11 and 12 is the main shaft 25 to which is secured a grooved pulley 26 having one end of a spring 27 secured thereto, and the other end of this spring is secured to the frame at 28, so that the shaft 25 is urged in a counterclockwise direction, as shown in Fig. 3, or in a clockwise direction, as shown in Fig. 1.

Figure 2:
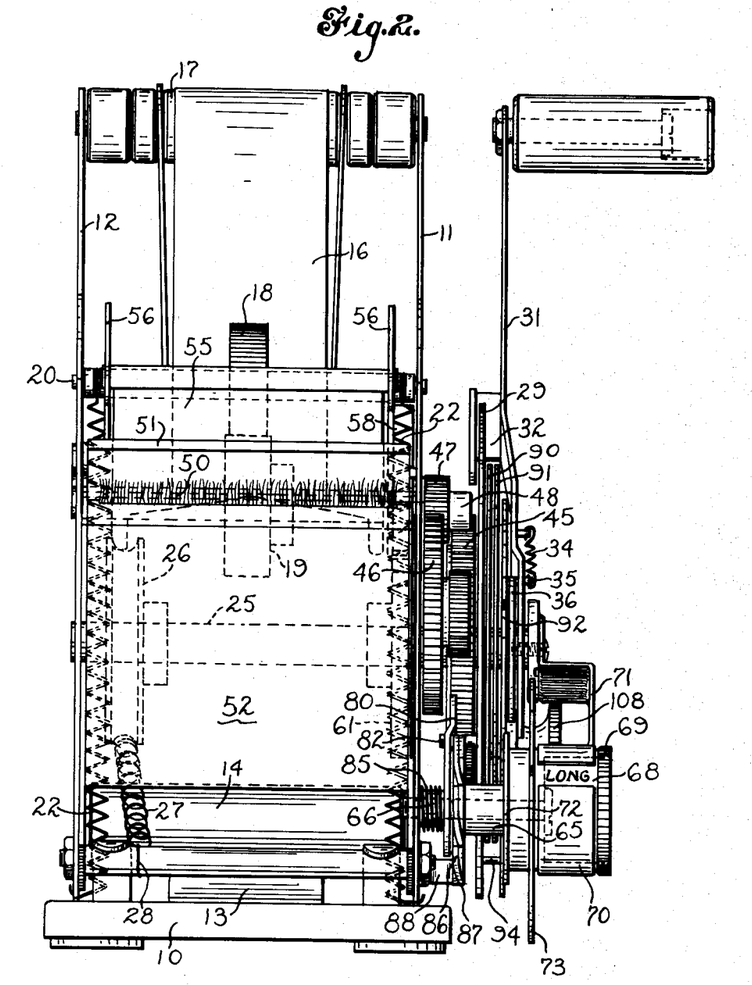
Fig. 2 is a front elevational view thereof.

The shaft 25 projects from the plate 11 at the right hand side of the frame, as shown in Fig. 2, and upon the extended end of this shaft is secured a disk 29 (Fig. 1). This disk is provided with a plurality of notches 30 so that an operating lever 31 may be adjustably secured to the disk by means of a dog 32 secured at the rear face of the lever 31, and adapted to enter one of the notches 30.

The lever 31 is loosely mounted upon the shaft 25 by means of an elongated slot 33 (Fig. 1) in the lever in which the shaft is received. This elongated slot permits the lever to be pulled radially outwardly so as to disengage the dog 32 from one of the notches 30, and permit the lever to be rotated about the shaft 25 to permit the dog 32 to enter another of the notches 30 and, thus, adjust the position of the lever with respect to the disk 29. The spring 34, connected at one end to the lever 31 and at the other end to a dog 35 on a washer 36 on the shaft 25, urges the lever 31 downwardly, as shown in Fig. 1, and, thus, causes the dog 32 to enter one of the notches 30. A pointer 37 secured to the lever 31 cooperates with indicia 38 on the disk 29 to indicate the length of the strip delivered in one stroke of the lever 31. It will be understood that the adjustment of the lever 31 determines the position of this lever at the start of the operation of the machine, as the disk 29 is brought to the same starting position each time by the spring 27, and, as the lever 31 is positively stopped at the end of its stroke, as will be hereinafter described, the position of this lever at the beginning of the operative stroke will determine the length of the strip of tape delivered.

It will be understood that the length of strip, as determined above by the position of the lever 31, is only one of the lengths which may be delivered by the machine, as will be hereinafter explained, and this length may be adjusted by different settings of the lever 31 with respect to the disk 29. The setting of the device to deliver other lengths during a cycle of operations will be later explained.

Loosely mounted upon the shaft 25 is an arm 40 (Fig. 4) and rotatably mounted upon this arm is a pinion 41. The shaft 42 of this opinion extends within an elongated slot 43 of the disk and adjacent one end of this slot is a laterally projecting dog 44 which enters between the teeth of the pinion and prevents rotation thereof. This slot allows lost motion between the disk 29 and the arm 40 at the beginning of the feeding stroke and, at the end of a return stroke, for when the crank or lever 31 is moved in a counterclockwise direction, as shown in Fig. 1, thus rotating the disk 29, this disk will rotate idly until the dog 44 enters between the teeth of the pinion 41, after which the arm 40, carrying this pinion, will be carried about the shaft 25 with the disk 29.

Figure 4:
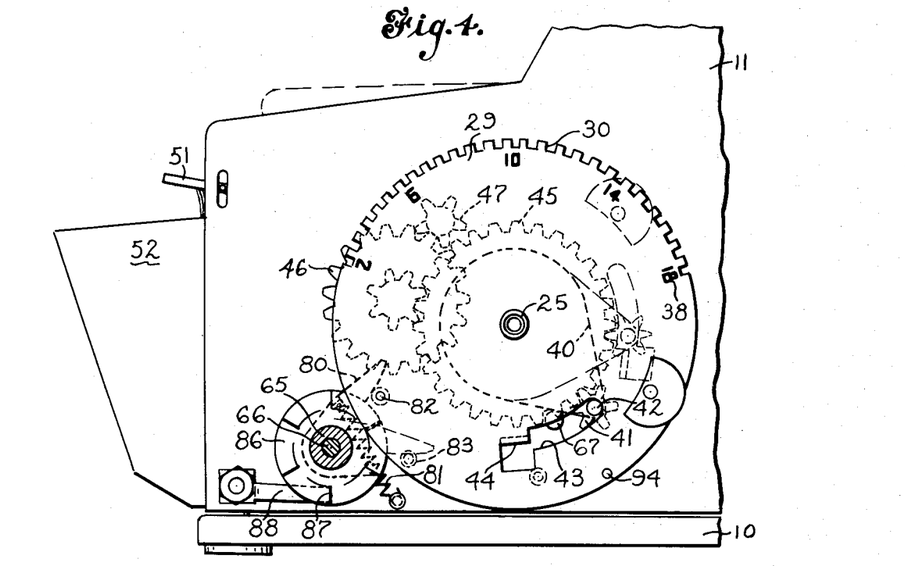
Fig. 4 is a side elevational view of the front portion of the machine with some parts being removed.

When the arm 40 is rotated about the shaft 25 by the engagement of the dog 44 between the teeth of the pinion 41, the latter being in mesh with a gear 45 loosely mounted on the shaft 25, it will effect rotation of this gear. Rotation of the gear 45 will serve, through the gearing 46 and pinion 47, to rotate the shaft 48 of the driven feed roll 19, as the pinion 47 is secured to this shaft. It will be seen, therefore, that oscillation of the crank or lever 31 will effect rotation of the feed roll 19 and, therefore, serve to dispense tape from the machine.

It may also be here stated that upon the beginning of a return stroke, the dog 44 will first pass out of engagement with the teeth of the pinion 41, thus permitting this pinion to rotate, and, when the other end of the slot 43 again engages the shaft 42 of the pinion, the arm 40 will be returned to its original position. During this return movement, the pinion 41 rotates freely around the gear 45 so that the latter is not moved in a rearward or non-feeding direction. Thus, the feed rolls 18 and 19 are at rest during the return movements of the parts.

As shown in Fig. 3, the dispensed tape passes from the machine between a moistening element 50 and a pressure plate 51, the moistening element being mounted in a suitable tank 52 for the moistening liquid.

A knife 55 is provided to sever the tape rearwardly of the pressure plate 51, this knife being mounted on an L-shaped frame 56 secured to a shaft 57 rotatably or rockably mounted in the frame plates 11 and 12. A disk 58 is secured to this shaft, this disk being provided with an arcuate recess 59 at one point in its periphery, the recess terminating in a tooth 60. Secured to the shaft 25 is a disk 61 generally circular in shape, the radius being of the proper length so that the circular portion of this disk will rotate within the recess 59 of the disk 58 without effecting movement of the latter. The disk 61 is provided with a flattened portion 62 from which projects a finger 63 adapted to engage the tooth 60 and hold the disk 58 in the position shown in Fig. 3, thus, holding the knife 55 in its lower position across the path of the tape. It will be understood that this is the position of the parts when the lever 31 is in the full-line position shown in Fig. 1.

When the lever 31 is moved forwardly, the disk 29 and shaft 25 will have a considerable movement prior to the movement of the pinion 41, due to the length of the slot 43. During this initial rotation of the disk 29 and shaft 25, the disk 61 (Fig. 3) will move from the full-line position to the dotted-line position shown in this figure. During this movement, the tooth 60 will first be released by the finger 63 and the corner of the flat surface 62 acting against the tooth 60 will rotate the disk 58 through a small angle until the circular part of the disk 61 will rotate freely in the arcuate recess 59. Thereafter, the disk 61 will rotate in this recess without moving the disk 58. This movement of the disk 58 moves the cutter frame 56 to the dotted-line position shown in Fig. 3 and, thus, moves the cutter or knife 55 out of the path of the tape so that the tape can be fed forwardly when the pinion 41 is picked up by the dog 44. Upon the reverse movement of the disk 61, the finger 63 strikes the tooth 60, thus rotating the disk 58 in a clockwise direction, as shown in Fig. 3, and bringing the knife frame 56 down to the full-line position, thus effecting the severing of the tape by the knife 55.

It has already been explained how the length of tape dispensed by the mechanism above described can be varied by adjusting the position of the lever 31 with respect to the disk 29 which adjusts the starting position of the lever. The length of the forward stroke of this lever, if not otherwise determined, as will be described hereinafter, is limited by contact of the lever with a sleeve 65 rotatably mounted on a post 66 (Fig. 2) secured to the frame plate 11. Upon the return stroke, the end position of the parts is determined by a stop pin 67 (Fig. 4) secured on the frame plate 11 which contacts the arm 40. Thus far the parts which have been described are those which may be employed to deliver and sever strips of tape, the length of which may be adjusted or varied by varying the setting of the lever 31 on the disk 29. The mechanism for delivering strips of various lengths in a predetermined cycle of operations will now be described.

Figure 8:
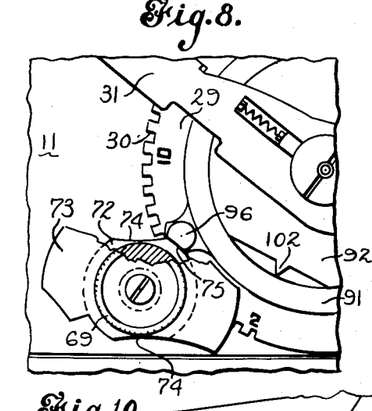
Figs. 8, 9, 10, 11 and 12 are elevational views of the forward portion of the machine showing various adjustments of the disks and stop members and the positions of the parts during strip feeding operations.

Secured to the sleeve 65, which is rotatably mounted on the post 66, is a stop drum 68 which may be rotated by the knurled member 69, this drum being held in position by a clamping member 70 which embraces the drum and which is secured to the arm 71 (Figs. 1 and 2), the arm 71 being fastened on the end of the shaft 25. Secured to the drum 68 are stop cams 72 and 73. As shown in Fig. 8, the inner cam 72 is substantially circular in shape, but is provided with arcuate recesses 74 arranged at diametrically opposite points. The substantially circular positions 75 of the periphery of the cam between these recesses serve as stop surfaces, as will be hereinafter explained. The outer cam 73 is of elongated form, but symmetrical as respects its opposite sides. Each of these sides is provided with arcuate recesses 76 and 77 and at its end portions are provided stop surfaces 78.

Pivoted on the post 66 (Fig. 4) is a pawl 80 urged in a clockwise direction by the spring 81 and moved in a counterclockwise direction by a pin 82 on the inner face of the disk 29. The normal position of this pawl, when the parts are at rest, is the upper position shown in Fig. 4 against the stop 82. When, however, the disk 29 moves in a counterclockwise direction and the stop 82 moves away from the pawl 80, this member will move downwardly to its lower dotted-line position shown in Fig. 4 until it rests against the stop 83 on the frame, the pawl staying in this position during continued rotation of the disk 29 and being picked up on the return rotation of this disk by the member 82 and again moved to the upper position shown in Fig. 4.

The pawl 80 is not only pivotally mounted on the shaft 66, but also mounted for sliding movement on this shaft and is urged to the right, as shown in Fig. 2, by a spring 85 so that it is urged against a ratchet wheel 86 secured to the sleeve 65, this ratchet wheel being provided with laterally directed teeth 87 so that when the pawl is moved from the lower position shown in Fig. 4 to the upper position it will move the ratchet wheel through a distance of one tooth. As there are six teeth on the wheel 86, the sleeve 65 and the cams 72 and 73 will be moved through a complete revolution in six strokes of the operating lever 31. A holding pawl 88 prevents reverse movement of the ratchet wheel.

Figure 5:
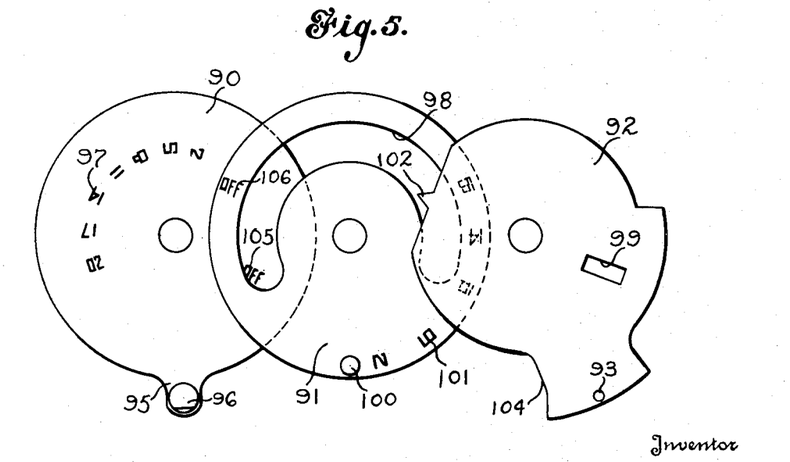
Fig. 5 is an exploded view of the adjustable stop disks.

In Fig. 5 are shown three disks 90, 91 and 92, the first two of these being stop disks and the disk 92 being an indicating disk. These disks are mounted upon the main shaft 25 against the outer face of the disk 29 in the order shown in Fig. 5. The disks 90 and 91 are mounted on the shaft for rotative adjustment thereon, while the disk 92 is secured against rotation by being provided with an opening 93 in which is received a pin 94 on the disk 29.

The disk 90 is mounted next to the member 29 and is provided with a projecting lug 95 having thereon a laterally extending stop pin 96. This disk is also provided with indicia 97 which are adapted to be exposed through the arcuate slot 98 in the disk 91 and also through the window opening 99 in the disk 92.

The disk 91 is of substantially the same diameter as the disk 90 and is provided adjacent its periphery with a stop pin 100 which, it will be seen, is nearer the shaft 25 than the stop pin 96, and with indicia 101 which indicia are designed to be exposed opposite the pointer 102 on the disk 92. The latter disk is of irregular shape and is provided with a radial extension in which the opening 93 is formed and which extension is provided with a stop shoulder 104. Both disks 90 and 91 are provided with "off" indications 105 and 106, shown more especially in Fig. 5.

It will be understood that the stop pin 96 cooperates with the stop surface 75 on the stop cam 72, but will pass by the arcuate recesses 74 when the sleeve 65 is in position to present these arcuate recesses toward the shaft 25. Also the stop pin 100 likewise cooperates with the stop surface 78 of the cam 73 but will pass by the arcuate recesses 76 and 77 when this cam is in position to present these surfaces toward the shaft 25.

The disks 90 and 91 may be adjusted to any desired position, rotatably, on the shaft 25 and may be secured in this position by a clamping nut 108 threadedly mounted upon a screw 109 secured in the disk 29. This clamping nut is sufficiently large so that while the screw is without the periphery of the disks 90, 91 and 92 the edge of the nut will engage the disk 92 and clamp the inner disks against the disk 29.

Figure 6:
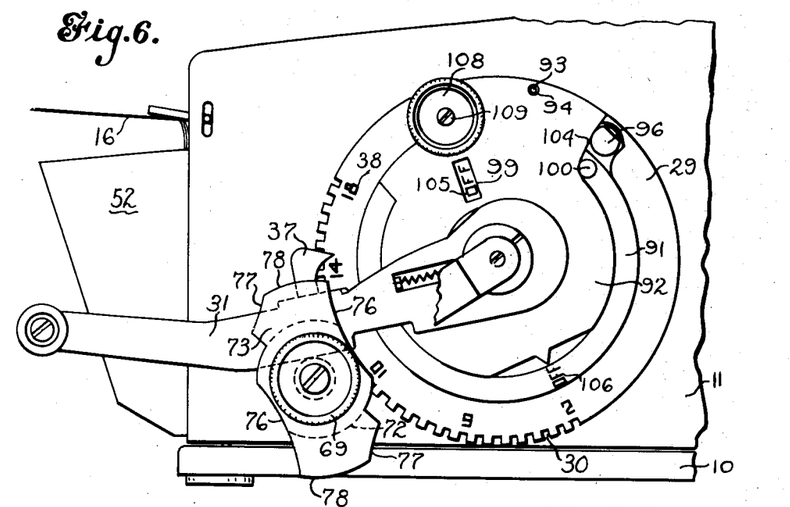
Fig. 6 is an elevational view of the forward portion of the machine similar to Fig. 1, but showing the parts in another position.

When the parts are in the position shown in Fig. 1, the disks 90 and 91 are inoperative for, as will be seen, the stop pins 96 and 100 lie against the shoulder 104 of disk 92 and, therefore, will never come into engagement with the cams 72 and 73 as these pins move in a counterclockwise direction from the position shown in this figure. If, therefore, the lever 31 is pulled to the left, a strip of tape will be dispensed by the machine, which strip will be of the length indicated by the pointer 37, the forward feeding movement being stopped by contact of the lever 31 with the sleeve 65, as shown in Fig. 6.

Successive strokes of the lever will, of course, deliver successive strips of tape of the same length. It will be noted that in this position the "off" indication on the disk 90 may be seen through the window 99 and the "off" indication on the disk 91 lies opposite the pointer 102 showing that both of these disks are in the "off" or inoperative position.

Figure 7:
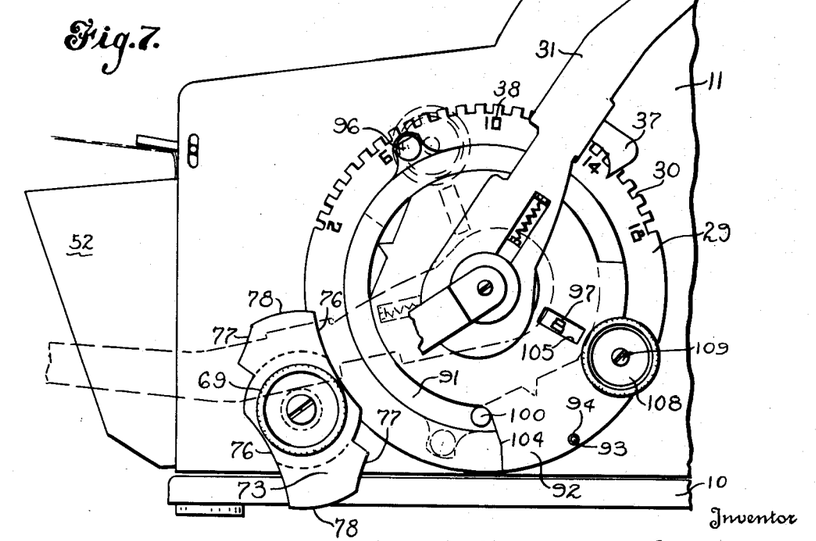
Fig. 7 is a view similar to Fig. 6 showing a still further position of the parts.

If now it is desired to deliver one long strip and two short strips, for example, the nut 108 is loosened and the disk 90 is rotated to the position shown in Fig. 7, the disk 91 remaining in its original position. At this time, it will be seen that the numeral "8" appears through the window 99 while the pointer 37 is substantially opposite the indication 14. The device is now set to deliver strips of two different lengths, namely 14" and 8". If the lever 31 is drawn forwardly with the parts in the position shown in Fig. 7, the 14" length will first be delivered as the stop pin 96 will pass by the arcuate recess 74 of the stop cam 72 and the forward feeding movement will be stopped by contact of the lever 31 with the sleeve 65, as shown in dotted lines in Fig. 7. During this forward movement of the device, the pawl 80 will be moved to its lower position shown in Fig. 4, and upon the return movement of the disk 29, the pawl will pick up the ratchet wheel 86 and move the sleeve 65 through ⅙ of a revolution, so as to move the cam 72 until the stop surface 75 is presented toward the stop pin 96.

Figure 9:
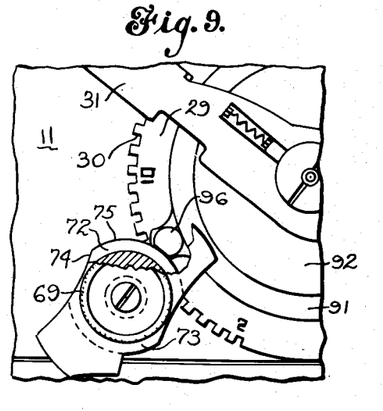

Upon the next movement of the lever 31 in a forward feeding direction, the stop pin 96 will engage the circular surface 75 of the cam 72, as shown in Fig. 8, and stop the forward movement of the parts, thus delivering an 8" strip of tape, while previously a 14" strip had been delivered. Upon the return movement of the parts, the sleeve 65 will again be moved through ⅙ of a revolution, but a portion of the stop surface 75 will still be in position to be engaged by the pin 96 (Fig. 9) owing to the length of this surface, and upon a third feeding movement of the lever, a second 8" strip will be delivered. This completes the cycle for which the machine is now set, for upon the third return movement of the disk 29, the second arcuate recess 74 will be presented to the stop pin 96, and will permit this pin to pass by, thus again delivering a 14" strip of tape. In this adjustment of the parts, therefore, the device will deliver a long, or 14" strip of tape, and then two short, or 8" strips of tape. It will be understood, of course, that either of these lengths may be varied by the setting of the handle 31, and the setting of the disk 90.

The order in which the various lengths are delivered may also be varied by changing the setting of the sleeve 65 which carries the cam disk 72. This sleeve may be rotated in a counterclockwise direction by means of the knurled surface 69 (Fig. 2) as the sleeve will rotate in this direction on the shaft 66, the ratchet wheel 86 moving past the pawl 80 in this direction, and the sleeve will be frictionally held in any adjusted position by the spring 85. It will be noted that the free ends of the clamp 70 are, as shown in Fig. 2, sufficiently far apart to permit the reading of indications on the drum 68 which indicate whether or not a long or short strip will next be delivered.

If, for example, the cam disk 72 be turned to the position shown in Fig. 8 prior to the beginning of a cycle of operations, and then the lever 31 actuated, the order of the delivery will be a short strip, a second short strip, and a long strip. If the disk 72 be turned to the position shown in Fig. 9, the device will first deliver a short strip, then a long strip, and then a short strip, and, of course, repeat this cycle of operations. It will be understood, of course, that the two short strips in the above operations will be of the same length.

It will be noted that in a cycle of three operations the cam disk 72 permits the pin to pass by the disk once, but acts as a stop for the pin during the other two operations. The stop pin 96 is not sufficiently long to engage the cam disk 73 so that this disk is inoperative while the pin 100 is set in the position shown in Fig. 7. However, if it is desired to deliver two long strips and one short strip, this may be effected by moving the disk 90 to the "off" position shown in Fig. 10 and moving the disk 91 to an operative position, shown in this figure, wherein the numeral "6," for example, lies opposite the pointer 102. As previously described, the cam 73 has two arcuate recesses 76 and 77 which will permit the pin 100 to pass without obstruction. Therefore, when this disk is employed, the setting of the lever 31 will determine the length of two of the three strips in a cycle of operations, while the setting of the pin 100 will determine the other length, this pin striking against one of the stop surfaces 78 of the cam 72.

Figure 10:
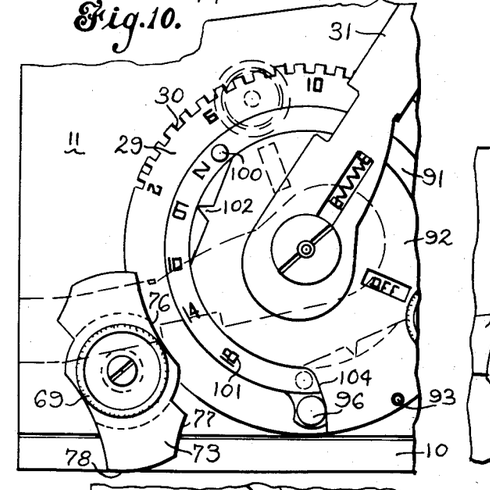
Figure 11:
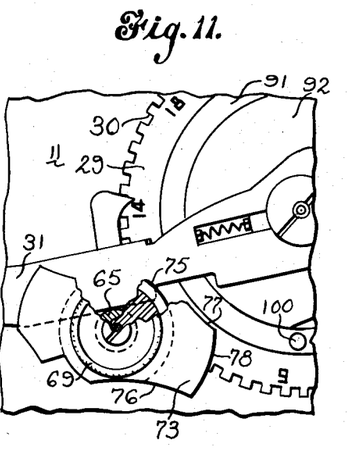
Figure 12:
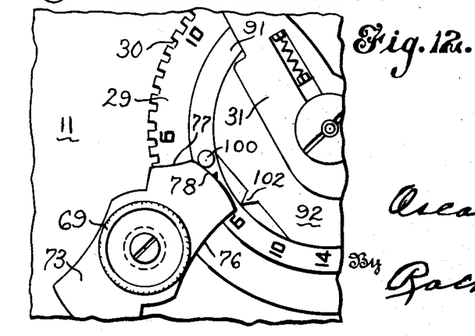

With the parts set in the position of Fig. 10, the operator may draw the lever 31 forwardly and, as the pin 100 will pass the cam surface 76, a long strip, for example a 14" strip, will be delivered. Upon the return of the mechanism, the parts will be moved to the position shown in Fig. 11, wherein the cam surface 77 will be presented toward the pin 100 and the latter will again pass this surface, thus delivering another 14" strip of tape. Upon the next return movement of the parts, the cam disks 73 will be turned to the position shown in Fig. 12 and, upon movement of the lever 31, the stop pin 100 will strike the cam surface 78 and thus, stop the forward feeding movement, and will deliver a 6" strip of tape.

Thus, using the disk 91 alone it is seen that two long strips and one short strip are delivered in a cycle of operations, and the order of delivery may again be changed by the setting of the drum 68 at the beginning of a cycle of operations. It will be understood that, as illustrated, the disks 72 and 73 are fixed upon the drum and, therefore, fixed in relation to each other, so that they always stand in the same relative positions shown in the drawings.

So far we have described the operation of the device when it is desired to use only two different lengths of tape in a cycle. It may, however, be desired to use three and, in such case, both disks 90 and 91 may be employed, it, however, being necessary to use the disk 91 for the shortest strip and the disk 90 for the strip of intermediate length.

If both of the disks are set in operative position and the lever is drawn forwardly, with the disks 72 and 73 in the position shown in Figs. 7 and 10, it will be seen that during the first feeding movement of the lever both pins 96 and 100 will pass the respective cams and a long strip will be delivered as determined by the setting of the lever 31. During the next movement of the lever, the stop pin 96 will engage the surface 75 of the cam 72 and a strip of intermediate length will be delivered. During a third operation of the lever 31, the cams 72 and 73 will be in the position shown in Fig. 12 and the pin 100 will strike the cam surface 78 and, thus, deliver a short strip of tape.

Again the cams 72 and 73 may be set before beginning a cycle of operations, so that the first strip delivered may either be a long strip, an intermediate strip, or a short strip.

The operations possible by the machine may be summed up briefly as follows:

When both stop disks 90 and 91 are inoperative, the length of the delivered strip will be determined by the setting of the handle 31 on the disk 29, and, as long as the setting of the handle remains the same, all of the delivered strips will be of even length.

When, however, we move the disk 90 to operative position, but leave the disk 91 in "off" position, we may secure the following combinations:

1 long strip—two even short strips
2 even short strips—1 long strip
1 short strip—1 long strip—1 short strip When the stop disk 91 is used alone, we may have the following combinations:

1 long strip—1 short strip—1 long strip
1 short strip—2 long strips
2 long strips—1 short strip When both disks 90 and 91 are employed, we may have the following combinations:

1 long strip—1 intermediate strip—1 short strip
1 intermediate strip—1 short strip—1 long strip
1 short strip—1 long strip—1 intermediate strip While I have shown and described some preferred embodiments of my invention, it will be understood that it is not to be limited to all of the details shown, but is capable of modification and variation within the spirit of the invention and within the scope of the claims.

What I claim is:

1. In a tape-dispensing machine, a frame, tape-feeding means on the frame including a movable actuating member, stop means movably mounted on the frame, said means including a cam-shaped member rotatably mounted on the frame and adapted in one position to engage a part of said actuating member and limit movement of the same, and in another position to stand free of said actuating member, and a connection between said actuating member and said cam-shaped member to shift the cam-shaped member from one of said positions to the other upon movement of the actuating lever.

2. In a tape-serving machine, tape-feeding means, an oscillatable member to actuate said feeding means when moved in one direction to feed a strip of tape, and stop means to control said member to deliver strips of tape of varied length upon successive feeding movements of said member, and said last-named means including a stop member movably mounted on the frame and actuated by said oscillatable member to a position to engage a part of said member.

3. In a tape-dispensing machine, tape-feeding means including an actuating member having a forward and return stroke, a stop member adapted to be positioned in the path of a part of said actuating member to determine the length of tape to be fed, and means engaged by said actuating member upon one stroke thereof to move said stop member to a position out of the path of the actuating member on the succeeding forward stroke thereof.

4. In a tape-dispensing machine, tape-feeding means including an actuating member, a plurality of stop members each of which is adapted to be positioned in the path of a part of said actuating member, each of said members comprising a cam having a surface to engage said part and a surface lying out of the path of said part, and means operable by feeding movement of said feeding means for rotating said cams from one position to another.

5. In a tape-dispensing machine, tape-feeding means including an actuating member, a plurality of stop members each of which is adapted to be positioned in the path of a part of said actuating member, each of said stop members comprising a cam having a surface to engage said part and a surface lying out of the path of said part, and means for rotating said cams from one position to another, one of said cams being mounted in position to engage one part of the actuating member and the other of said cams engaging another part thereof and being at all times out of the path of said first part.

6. In a tape-dispensing machine, a frame, tape-feeding means on the frame including an actuating member, a member on the frame lying in the path of a part of said member to limit movement thereof, a plurality of stop members adustably mounted on the actuating member, and a plurality of cam members rotatably mounted on the frame, each of which is adapted to be moved to a position to engage one of said stop members and limit movement of the actuating member.

7. In a tape-dispensing machine, a frame, tape-feeding means on the frame including an actuating member, a member on the frame lying in the path of a part of said member to limit movement thereof, a plurality of stop members adjustably mounted on the actuating member, a plurality of cam members rotatably mounted on the frame, each of which is adapted to be moved to a position to engage one of said stop members and limit movement of the actuating member, and connections between said actuating member and said cam members to move the latter upon a feeding movement of the actuating member.

8. In a tape-dispensing machine, a frame, tape-feeding means on the frame including an actuating member, a member on the frame lying in the path of a part of said actuating member to limit movement thereof, a stop member adjustably mounted on said actuating member, and a cam member rotatably mounted on the frame, said cam member being an irregular shape and adapted to engage said stop member in one position of the cam member and to permit passage of said stop member thereby in another position of the cam member.

9. In a tape-dispensing machine, tape-feeding means comprising an oscillatable actuating member having a forward and return movement, and an angularly adjustable stop means to limit the forward movement of said member controlled by the movement of said actuating member in feeding tape and including selectively adjustable stop cams.

10. In a tape-dispensing machine, tape-feeding means comprising an oscillatable actuating member having a forward and return movement, and an angularly adjustable stop means to limit the forward movement of said member controlled by the movement of said actuating member in feeding tape and including selectively adjustable stop cams and selectively operable stop disks cooperating with said cams.

References Cited in the file of this patent

UNITED STATES PATENTS

| | | |
|---|---|---|
| 1,827,745 | Hagemann | Oct. 20, 1931 |
| 1,960,945 | Krueger | May 29, 1934 |
| 2,022,823 | Racz | Dec. 3, 1935 |
| 2,066,619 | Gautier | Jan. 5, 1937 |
| 2,170,696 | Rhodes | Aug. 22, 1939 |
| 2,219,299 | Dawson et al. | Oct. 29, 1940 |
| 2,366,971 | Krueger | Jan. 9, 1945 |